(12) United States Patent
Nishimura

(10) Patent No.: US 6,222,684 B1
(45) Date of Patent: Apr. 24, 2001

(54) APERTURE REGULATING APPARATUS

(75) Inventor: Syunji Nishimura, Saitama (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 09/504,902

(22) Filed: Feb. 16, 2000

(30) Foreign Application Priority Data

Feb. 16, 2000 (JP) .................................................. 11-037031

(51) Int. Cl.⁷ ........................................................ G02B 9/08
(52) U.S. Cl. ............................................ 359/740; 359/699
(58) Field of Search ..................................... 359/739, 740, 359/738, 699, 700, 701

(56) References Cited

FOREIGN PATENT DOCUMENTS

3-107132   5/1991   (JP) .

Primary Examiner—Scott J. Sugarman
(74) Attorney, Agent, or Firm—Young & Thompson (57) ABSTRACT

In a zoom lens barrel, a driving barrel is rotated when magnification is changed. Upon this rotation, a moving barrel having a front lens group and a shutter block is moved in an optical axis direction. A straight guide barrel for preventing the moving barrel from rotating is rotatably supported in the driving barrel. Further, a cam barrel is rotatably supported in the straight guide barrel. The rotation of the driving barrel is transmitted to rotate the cam barrel. A rear-lens-group holder contained in the cam barrel is moved in the optical axis direction owing to workings of the cam barrel and the straight guide barrel. The shutter block is provided with a projection for changing a maximum aperture size of the shutter blades. An inner surface of the cam barrel is provided with a cam groove obliquely formed in a rotational direction around the optical axis. The cam groove engages with the projection when the shutter block enters the cam barrel, and regulates the maximum aperture size of the shutter blades.

12 Claims, 11 Drawing Sheets

WIDE-ANGLE SIDE ⟵ ROTATIONAL DIRECTION OF CAM BARREL ⟶ TELEPHOTO SIDE

FIG. 1

WIDE-ANGLE SIDE ⟷ TELEPHOTO SIDE

ROTATIONAL DIRECTION
OF CAM BARREL

APERTURE REGULATING APPARATUS

BACKGROUND OF THE INVENTION

1. Field of the Invention

The present invention relates to a maximum-aperture regulating apparatus in which a maximum aperture size of a shutter blade is changed in accordance with a focal length of a taking lens.

2. Description of the Related Art

It is known that a low-priced shutter mechanism (program shutter) which is also used as a diaphragm employs a motor of a moving-magnet type. As to this motor, a rotor of a permanent magnet is reciprocated within a range of a predetermined angle in response to a current direction flowing in a coil. Upon this, a shutter blade is opened and closed. Although the motor of the moving-magnet type is inexpensive in comparison with a pulse motor, it is impossible to accurately control an aperture size of the shutter blade in accordance with an exposure value. For this, a regulating device is provided for regulating a rotational range of the shutter blade to a diameter at which the whole of a shutter opening is bared. An exposure amount is controlled by managing an operation time of the shutter blade.

There is a system in which an operation time of a shutter blade is controlled in accordance with an exposure value. In this system, when a taking lens is a zoom lens for example, brightness of the taking lens changes at a wide-angle side and at a telephoto side. Thus, it is necessary to make an aperture size of the shutter blade smaller at the wide-angle side in comparison with the telephoto side. Moreover, it is desirable to make a stop smaller at the wide-angle side in order to reduce a image periphery blur caused by spherical aberration of the lens. In view of this, Japanese Patent Laid-Open Publication No. 3-107132 proposes a regulating device for a zoom lens stop in which a maximum aperture size of a shutter blade, which is also used as a diaphragm, is changed in accordance with a focal length of a taking lens.

Regarding the device described in the above-mentioned Publication, a program shutter which is used as a diaphragm is incorporated in a lens group moving inside a lens barrel along an optical axis direction. From this program shutter, a part of a drive lever for driving the shutter blade projects toward an outer periphery. When zooming is performed within a prescribed range of the wide-angle side, the part of the drive lever engages with a cam to regulate a rotational range of the drive lever. The cam is provided on an inner surface of the lens barrel so as to incline in the optical axis direction. In this way, the maximum aperture size of the shutter blade is regulated in accordance with the focal length of the taking lens within the prescribed range.

However, in the device described in the above-mentioned Publication, the cam inclining in the optical axis direction is provided on the inner surface of the lens barrel so that the cam requires a length corresponding to a moving amount of the lens group. This lens group moves in the optical axis direction within the prescribed range of the wide-angle side. In case the moving amount of the lens group is long, the cam becomes long as well. Thus, there arises a problem in that the lens barrel has a large size in itself. Contrary, in case the moving amount of the lens group is small, it is necessary to steeply incline the cam. In this case, it is difficult to accurately regulate the maximum aperture size of the shutter blade.

SUMMARY OF THE INVENTION

In view of the foregoing, it is a primary object of the present invention to provide an aperture regulating device in which a size of a lens barrel itself is reduced.

It is a second object of the present invention to provide an aperture regulating device in which a maximum aperture size of a shutter blade can be accurately regulated in accordance with a focal length of a taking lens.

In order to achieve the above and other objects, the aperture regulating device according to the present invention comprises a shutter block which is provided with an aperture regulating member for regulating a maximum aperture size.

The shutter block includes two shutter blades rotated for forming an aperture. One of the shutter blades abuts on the aperture regulating member so as to regulate the maximum aperture size. In the present invention, the maximum aperture size is altered by changing an abutting position of the shutter blade and the aperture regulating member.

Changing the abutting position is performed by working of a projection and a cam groove. The projection is integrally formed with the aperture regulating member, and the cam groove is formed in an inner face of a cam barrel so as to engage with the projection. The cam barrel is rotated to move in an optical axis direction, and the cam groove is obliquely formed in a rotational direction of the cam barrel.

The cam groove slopes in the rotational direction of the cam barrel. In other words, depth of the cam groove changes along the rotational direction of the cam barrel. Thus, the projection engages with the cam groove more deeply as the cam barrel is rotated. In accordance with an engagement amount of the projection and the cam groove, the abutting position of the shutter blade and the aperture regulating member is changed. Upon the change of the abutting position, the maximum aperture size defined by the shutter blades are altered.

In this way, the maximum aperture size is regulated by the workings of the projection of the aperture regulating member and the cam groove formed in the inner face of the cam barrel. Incidentally, the maximum aperture size is regulated in accordance with a focal length of a taking lens in order to prevent a image periphery blur from occurring.

BRIEF DESCRIPTION OF THE DRAWINGS

The above objects and advantages of the present invention will become apparent from the following detailed description of the preferred embodiments of the invention when read in conjunction with the accompanying drawings, in which.

DETAILED DESCRIPTION OF THE PREFERRED EMBODIMENT(S)

In a zoom-lens barrel 10 of the present invention, a taking lens is constituted of a front lens group 11 and a rear lens group 12. The lens groups 11 and 12 are respectively moved in a direction of an optical axis 13 so as to change an interval between them. Owing to this, a focal length is continuously changed. Focusing is performed by moving the front lens group 11 in the optical axis direction.

Figure 3:
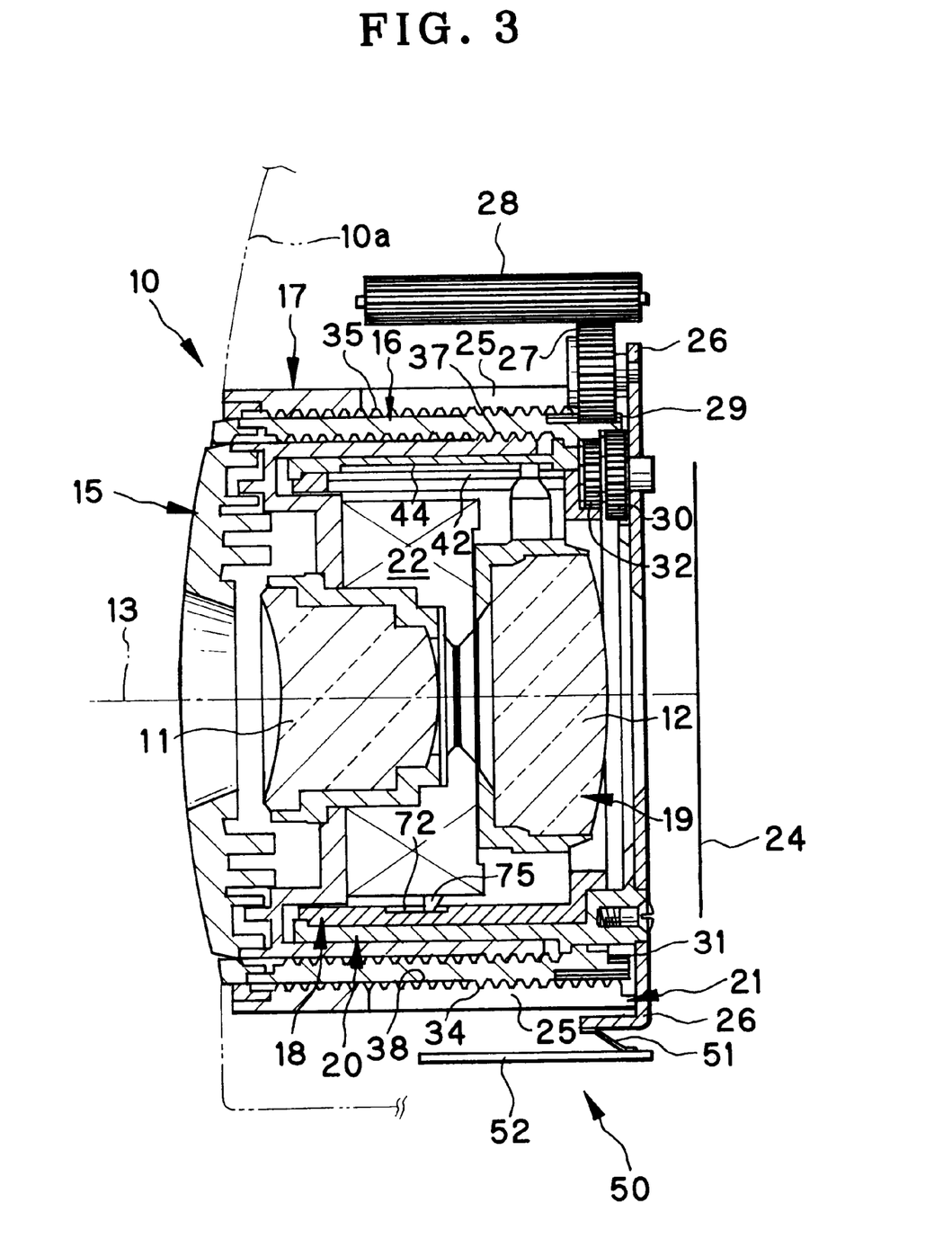
FIG. 3 is a sectional view showing a state in that the zoom-lens barrel is set to a collapsible mount position.

When a power supply of a camera is turned off, as shown in FIG. 3, the zoom-lens barrel 10 is set to a collapsible mount position where the lens groups 11 and 12 are contained in a camera body 10a. When the power supply of the camera is turned on, the lens groups 11 and 12 are moved to a wide-angle position shown in FIG. 4. Then, in accordance with a varied frame, the lens groups 11 and 12 are moved between the wide-angle position and a telephoto position shown in FIG. 5.

Figure 2:
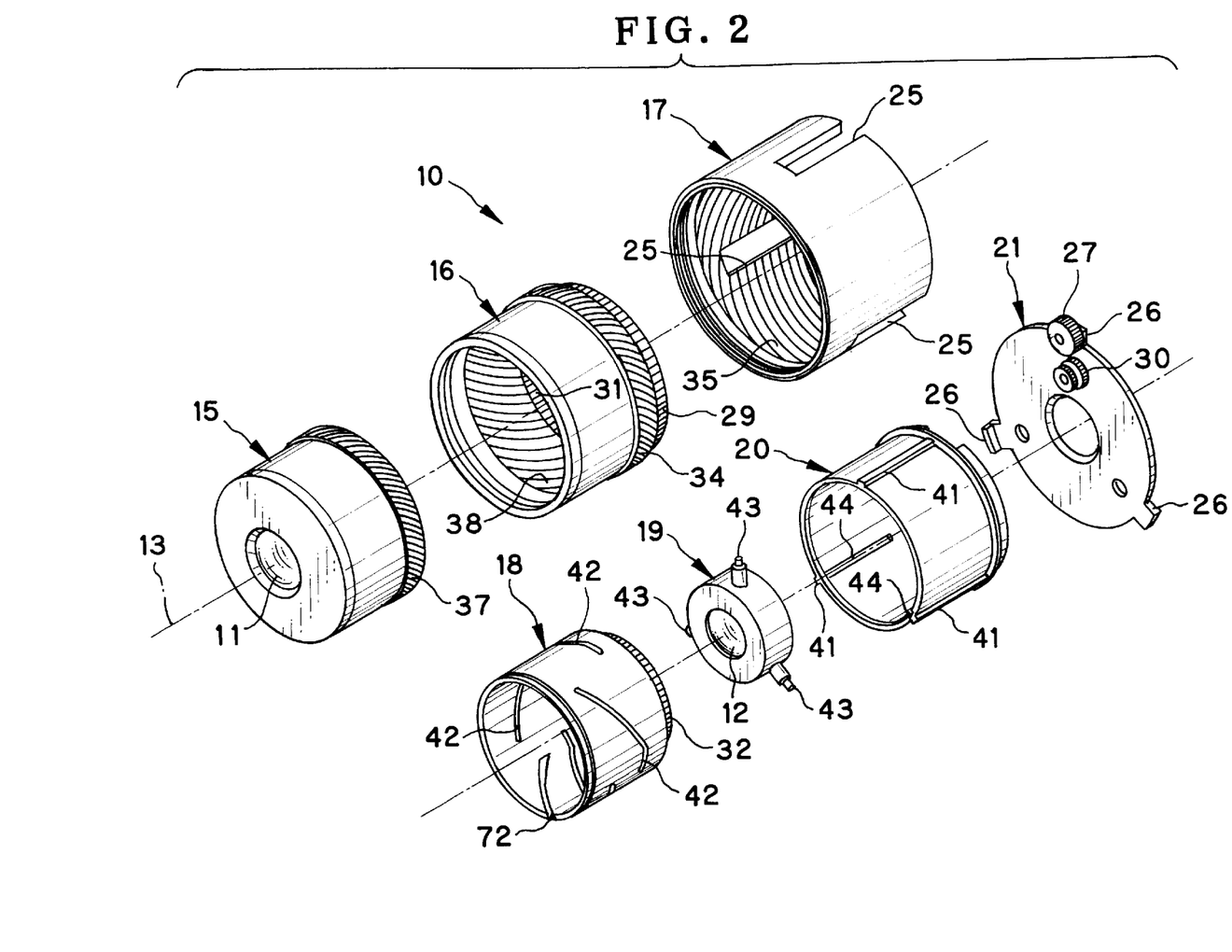
FIG. 2 is an exploded perspective view schematically showing a zoom-lens barrel.

The zoom lens barrel 10 comprises a moving barrel 15, a driving barrel 16, a fixed barrel 17, a cam barrel 18, a rear-lens-group holder 19, a straight guide barrel 20, and a guide ring 21. The front lens group 11 and a shutter block 22 are built in the moving barrel 15. The front lens group 11 is moved at the time of focusing by a focus motor which is not shown. The front lens group 11 is moved in the direction of the optical axis 13 of the moving barrel 15. The focus motor is fixed to the inside of the moving barrel 15. The shutter block 22 is fixed between the front lens group 11 and the rear lens group 12, and has a built-in shutter mechanism which is also used as a diaphragm. The moving barrel 15 holds the shutter block 22 so as to have a gap between an inner surface of the moving barrel 15 and the shutter block 22.

The driving barrel 16 is attached to the inside of the fixed barrel 17. The moving barrel 15 is attached to the inside of the driving barrel 16. Further, the straight guide barrel 20 is rotatably attached to the inside of the driving barrel 16. A rear end of the guide barrel 20 slightly protrudes toward a film surface 24 rather than a rear end of the driving barrel 16. The guide ring 21 is fixed to the rear end of the guide barrel 20. The guide ring 21 has three guide portions 26 which are formed so as to project. These guide portions 26 respectively engage with three guide openings 25 provided in the fixed barrel 17.

One of the three guide portions 26 is provided with a first gear 27 meshing with both of a gear bar 28 and a gear portion 29. The gear bar 28 is driven by a motor and the gear portion 29 is formed on a rear periphery of the driving barrel 16. The first gear 27 transmits rotational drive of the motor to the driving barrel 16 to rotate the driving barrel 16 around the optical axis 13. Further, the above-mentioned guide member 26 is provided with a double gear 30 disposed under the first gear 27. The double gear 30 meshes with gears 31 and 32. The gear 31 is formed on an inner-rear surface of the driving barrel 16, and the gear 32 is formed on an outer-rear surface of the cam barrel 18. The double gear 30 transmits the rotation of the driving barrel 16 to the cam barrel 18.

The fixed barrel 17 is fixed to the camera body 10a. The driving barrel 16 engages with the fixed barrel 17 in helicoid structure by means of helicoid portions 34 and 35. The helicoid portion 34 is provided on an outer periphery of the driving barrel 16, and the helicoid portion 35 is provided on an inner surface of the fixed barrel 17. When the rotational drive is transmitted from the motor, the driving barrel 16 is moved in the optical axis direction due to the helicoid portions 34 and 35, rotating in the fixed barrel 17. The guide barrel 20 is moved together with the driving barrel 16 in a state that a rotation of the guide barrel 20 is prevented by the guide ring 21. The guide barrel 20 is moved between an insertion position and an evacuation position. At the insertion position, the guide barrel 20 is inserted in a space formed between an inner surface of the moving barrel 15 and a periphery of the shutter block 22. The guide barrel 20 is separated from this space when it is set to the evacuation position.

The moving barrel 15 engages with the driving barrel 16 in helicoid structure by means of helicoid portions 37 and 38. The helicoid portion 37 is provided on a periphery of the moving barrel 15. The helicoid portion 38 is provided on an inner surface of the driving barrel 16. Moreover, three straight guide grooves 40 are formed on an inner surface of the moving barrel 15. Three straight guide ridges 41 provided on the periphery of the guide barrel 20 engage with the guide grooves 40 respectively. Upon rotation of the driving barrel 16, the moving barrel 15 is moved in the optical axis direction of the driving barrel 16 due to the helicoid portions 37 and 38. At this time, the moving barrel 15 is moved in a state that a rotation of the moving barrel 15 is prevented by the guide barrel 20.

The guide barrel 20 rotatably supports the cam barrel 18 therein. The cam barrel 18 is moved in the optical axis direction together with the guide barrel 20 and the driving barrel 16 while it rotates. The cam barrel 18 is moved between an insertion position and an evacuation position. At the insertion position, the cam barrel 18 is inserted in the space formed between the inner surface of the moving barrel 15 and the periphery of the shutter block 22. The cam barrel 18 is separated from this space when it is set to the evacuation position. The cam barrel 18 has the rear-lens-group holder 19 disposed therein. Moreover, a periphery of the cam barrel 18 is formed with three cam slots 42 for the variable power. The cam slots 42 respectively engages with three cam pins 43 projecting from the rear-lens-group holder 19. The three cam pins 43 project outwardly through the cam slots 42, and tips thereof respectively engage with three straight guide grooves 44 formed in an inner surface of the guide barrel 20. When the cam barrel 18 is rotated by the rotational drive obtained from the double gear 30, the rear-lens-group holder 19 is moved in the optical axis direction of the driving barrel 16 due to the guide grooves 44 and the cam slot 42 in a state that it is prevented from rotating.

The zoom lens 10 is provided with a detecting device 50 for a variable-power position, or a vari-focal position. The detecting device 50 is constituted of a slider 51 attached to the guide portion 26, and a code board 52 fixed to the camera body 10a. When the slider 51 moving with the driving barrel 16 slides on the code board 52, a code corresponding to the variable-power position of the zoom lens 10 is obtained from the code board 52. Based on this code, a focal length of lens groups 11 and 12 are determined.

Figure 6:
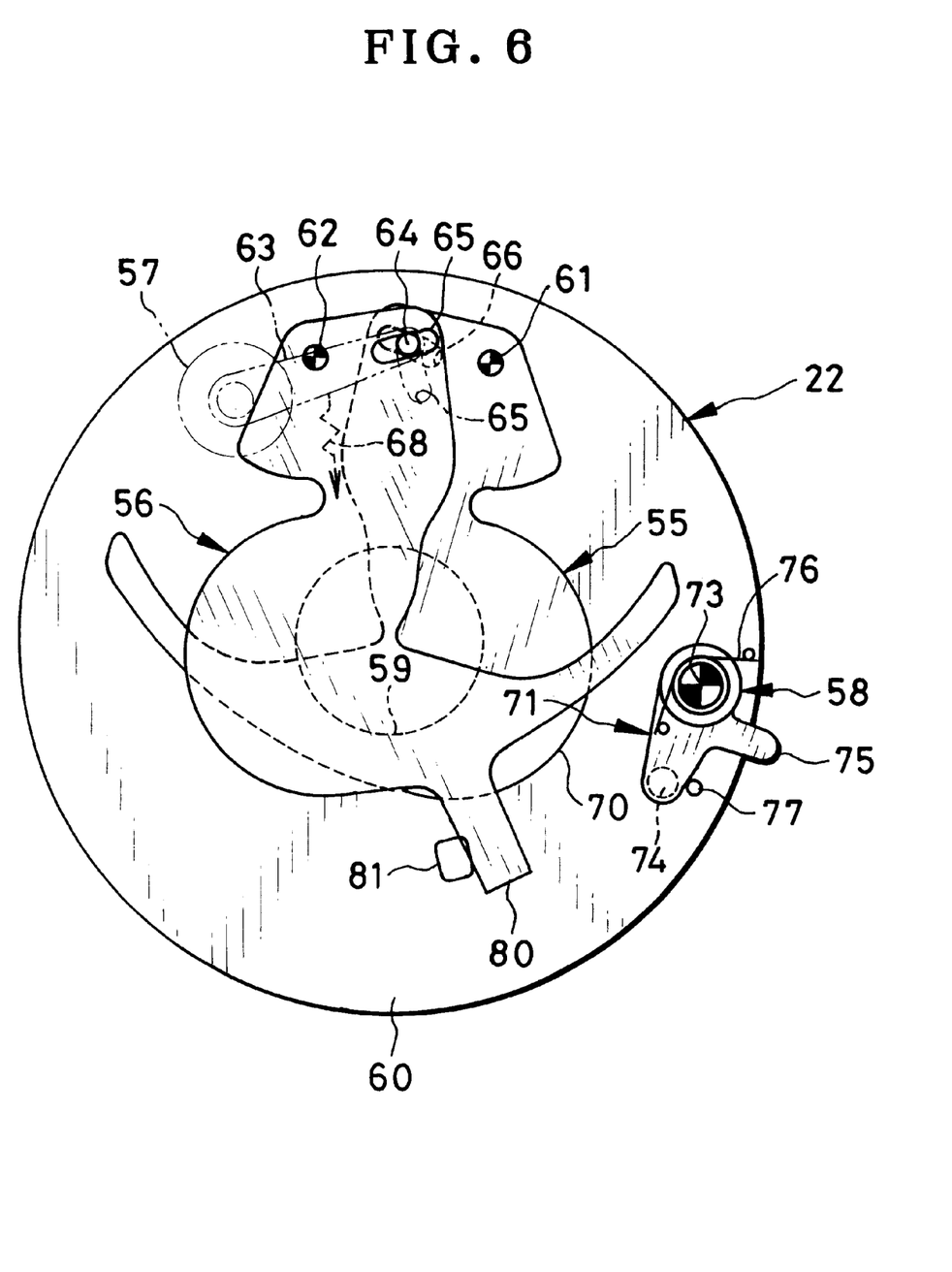
FIG. 6 is an explanatory illustration showing a shutter mechanism in a closed state.
Figure 7:
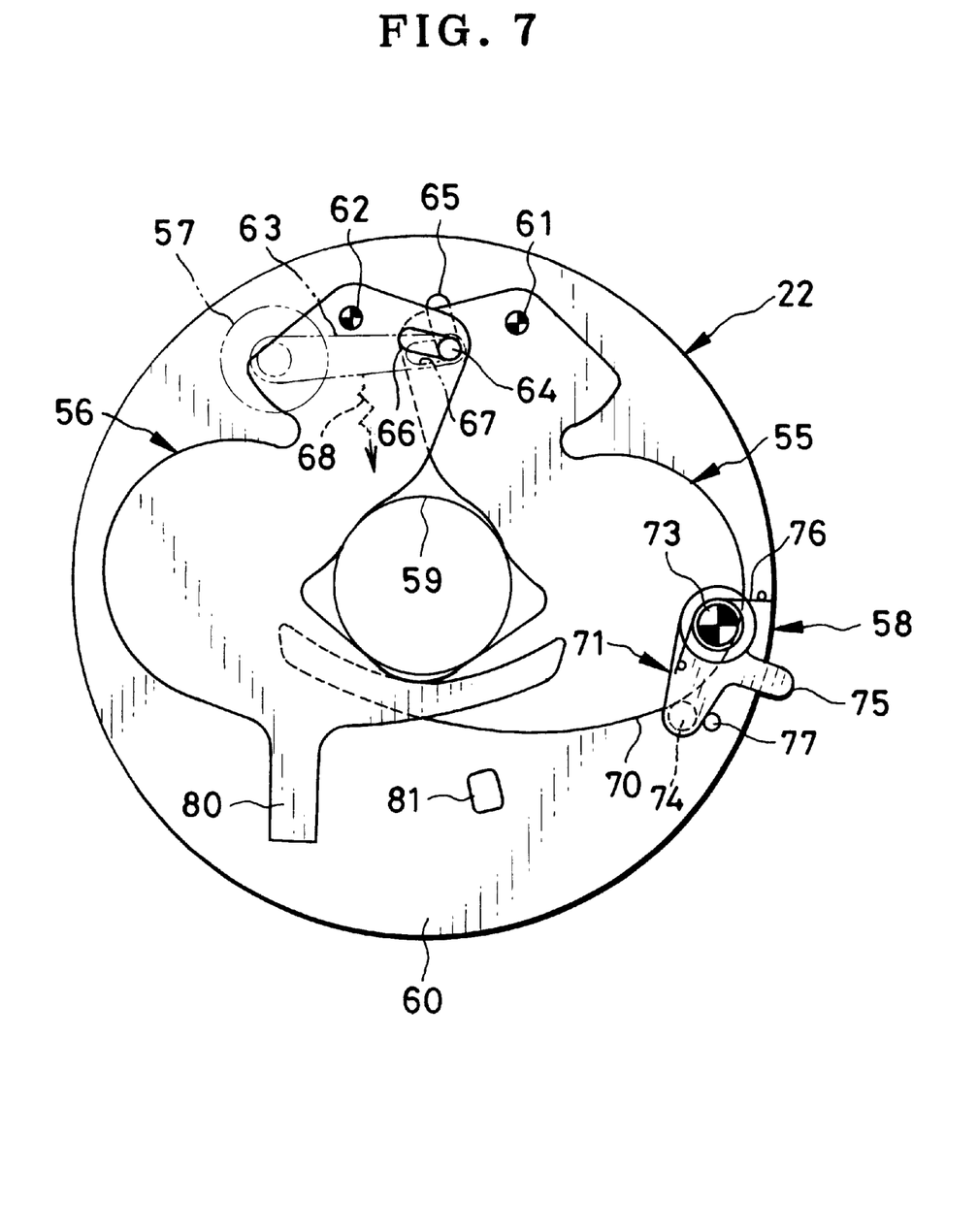
FIG. 7 is an explanatory illustration showing the shutter mechanism in an open state.

As shown in FIGS. 6 and 7, a shutter mechanism built in the shutter block 22 comprises two shutter blades 55 and 56, a motor 57 of a moving-magnet type, a maximum-aperture regulating mechanism 58 and so forth which are attached to a shutter board 60 having a shutter opening 59. The motor 57 is fixed to one face of the shutter board 60. By passing an electric current through a coil, the motor 57 is revolved forwardly or backwardly by a predetermined angle in response to a current flowing direction. Rotational shafts 61 and 62 for rotatably supporting the shutter blades 55 and 56 are provided on the other face of the shutter board 60.

One end of a driving lever 63 is fixed to an output shaft of the motor 57. The other end of the driving lever 63 is provided with a driving pin 64. The driving pin 64 passes through an elliptic hole 65 of the shutter board 60 and engages with engaging holes 66 and 67 respectively formed in the shutter blades 55 and 56. Upon movement of the driving pin 64, the shutter blades 55 and 56 cross each other in front of the shutter opening 59. The shutter blades 55 and 56 are rotated between a close position shown in FIG. 6 and an open position shown in FIG. 7. The shutter opening 59 is closed when the shutter blades 55 and 56 are set to the close position, and is opened when the shutter blades 55 and 56 are set to the open position. A spring 68 is attached to the driving lever 63. The spring 68 urges the driving lever 63 so as not to cover the shutter opening 59 with the shutter blades 55 and 56. The close position of the shutter blades 55 and 56 is regulated by pressing the driving pin 64 against one side of the elliptic hole 65 of the shutter board 60.

Figure 1:
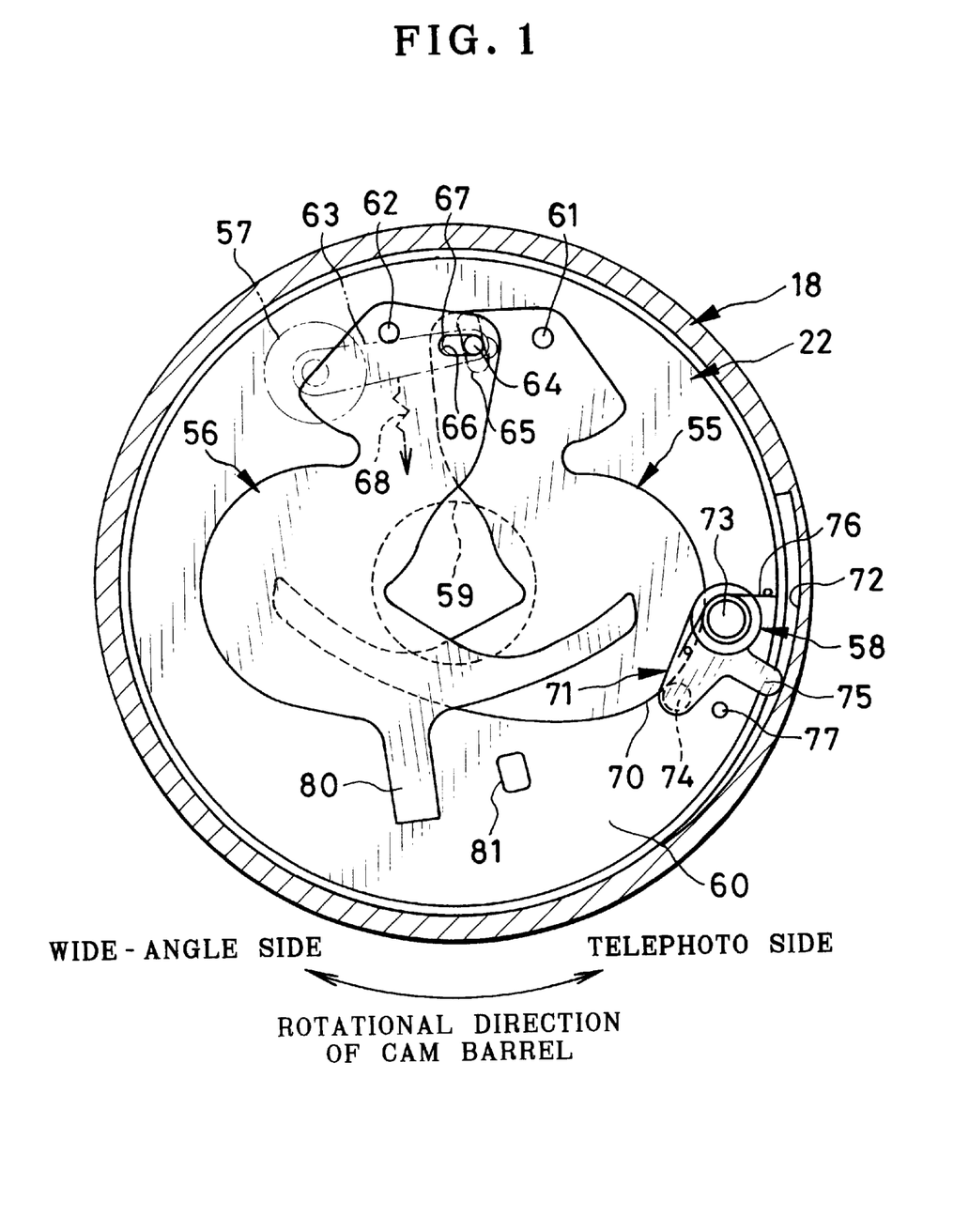
FIG. 1 is an explanatory illustration showing a section of a shutter mechanism and a cam barrel, and showing a state in that a shutter blade is regulated to a maximum aperture size by a regulating member when a taking lens is located at a wide-angle side.

The maximum-aperture regulating mechanism 58 is for regulating a maximum aperture size defined by the shutter blades 55 and 56. As shown in FIG. 1, the regulating mechanism 58 is constituted of a part 70 of a contour of the shutter blade 55, an aperture regulating member 71 abutting on this part 70, and a maximum-aperture regulating cam 72 formed in an inner face of the cam barrel 18. The regulating member 71 is disposed on a rotational orbit of the shutter blade 55, and one end of which is rotatably attached to a mounting shaft 73 provided on the shutter board 60. The regulating member 71 is integrally formed with a regulating pin 74 and a projection 75. The regulating pin 74 is positioned at the other end of the regulating member 71, and the projection 75 is positioned between the both ends of the regulating member 71.

The regulating pin 74 abuts on the part 70 of the shutter blade 55 to regulate the aperture size defined by the shutter blades 55 and 56. The projection 75 protrudes from a periphery of the shutter block 22 toward the outside. The regulating member 71 is normally urged by a spring 76 to a position where the regulating member 71 abuts on a stopper 77. At this position, the shutter blades 55 and 56 are opened such that the whole of the shutter opening 59 is bared.

Figure 4:
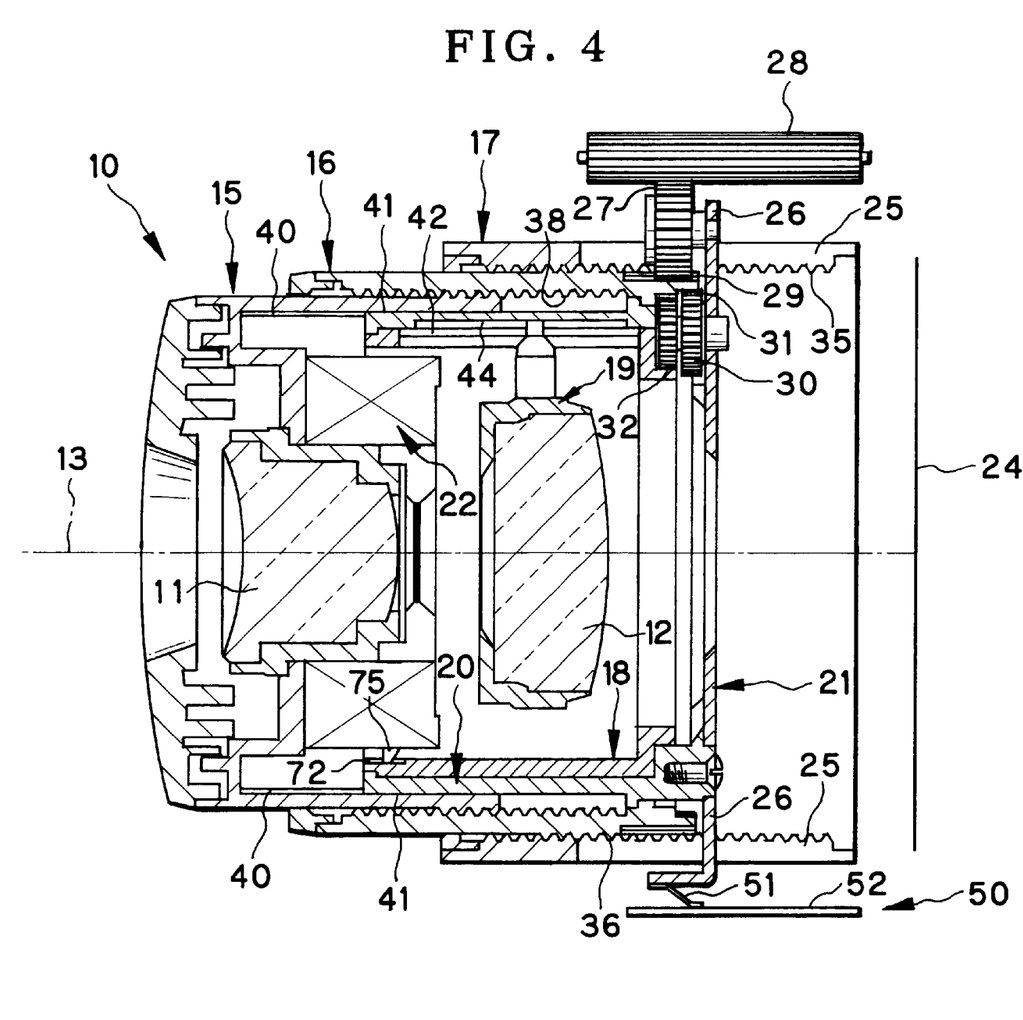
FIG. 4 is a sectional view showing a state in that the zoom-lens barrel is set to a wide-angle side.
Figure 5:
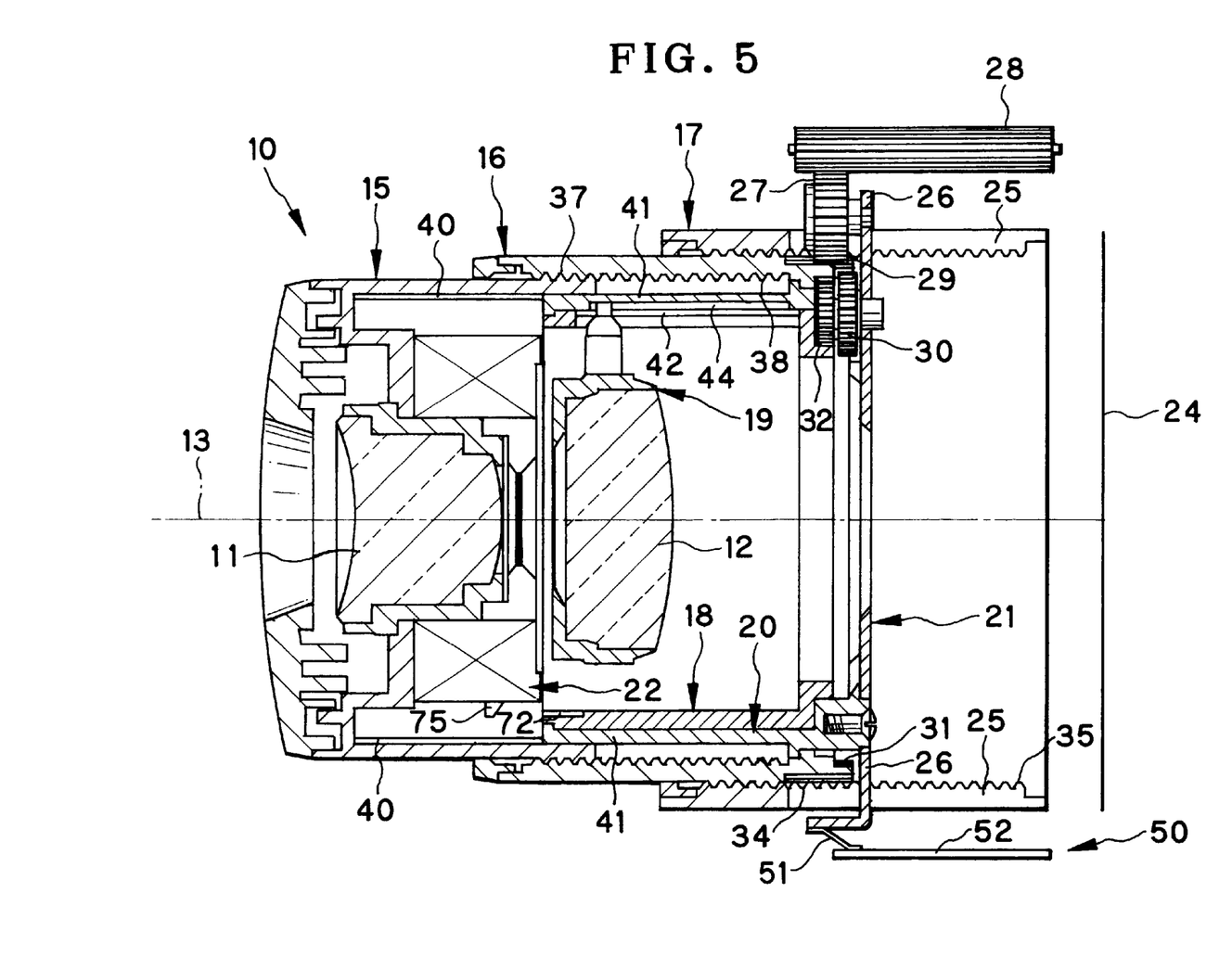
FIG. 5 is a sectional view showing a state in that the zoom-lens barrel is set to a telephoto side.

As shown in FIGS. 3 and 4, the shutter block 22 contained in the moving barrel 15 is located in the cam barrel 18 when the shutter block 22 is positioned between the collapsible mount position of the zoom lens 10 and the prescribed wide-angle position. As shown in FIG. 5, the shutter block 22 goes out of the cam barrel 18 when the shutter block 22 is positioned between the prescribed wide-angle position and the telephoto position. The regulating cam 72 formed in the inner face of the cam barrel 18 engages with the projection 75 when the shutter block 22 is set between the collapsible mount position of the zoom lens 10 and the prescribed wide-angle position.

Figure 8:
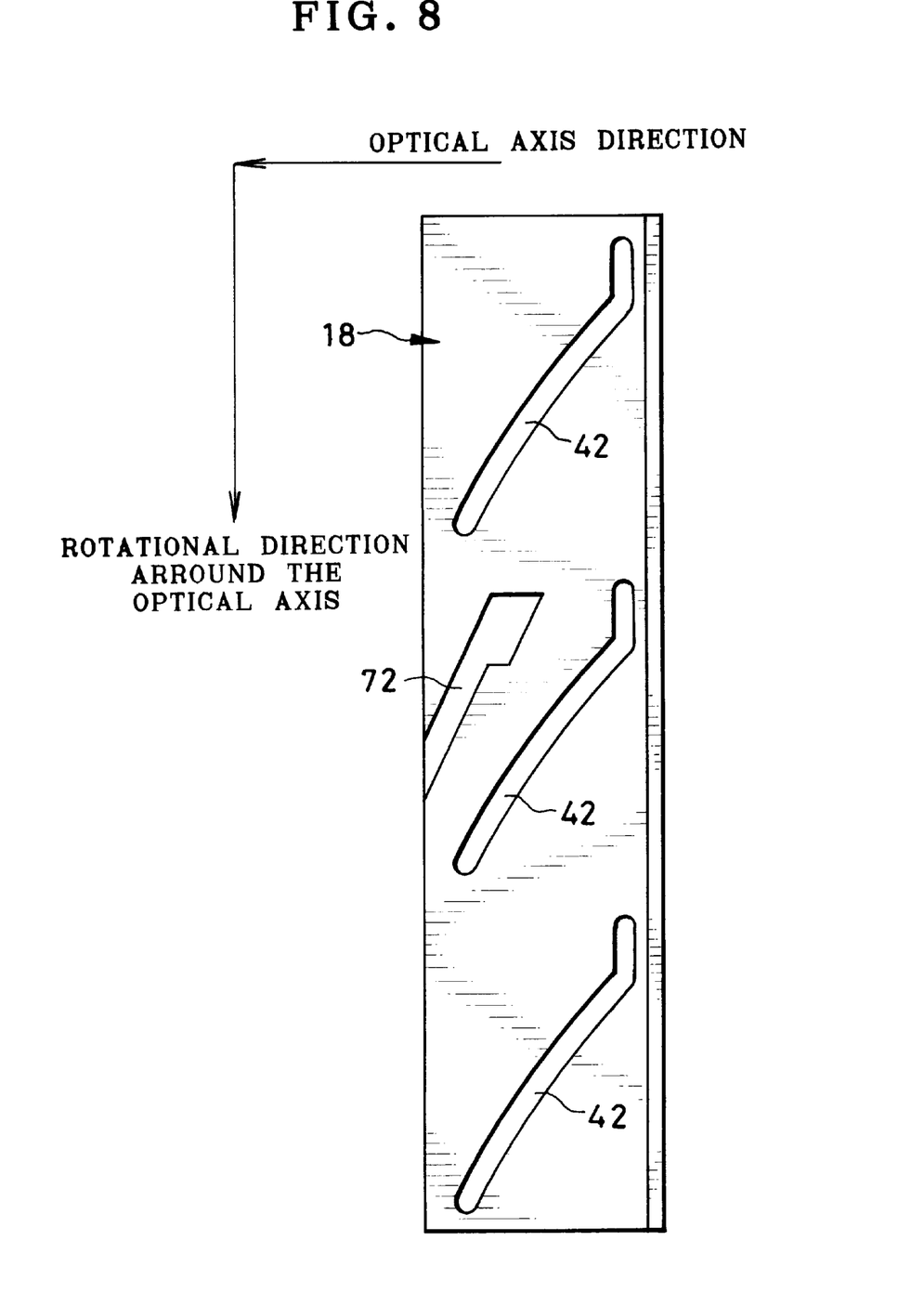
FIG. 8 is a development showing a cam barrel.

As shown in FIG. 8, the regulating cam 72 is formed in a groove state between the two cam slots 42. One end of the regulating cam 72 continues to the front edge of the cam barrel 18. The cam 72 is obliquely formed in the inner face of the cam barrel 18 so as to take account of a rotational amount of the cam barrel 18, a moving amount of the cam barrel 18, and a moving amount of the moving barrel 15.

Figure 9:
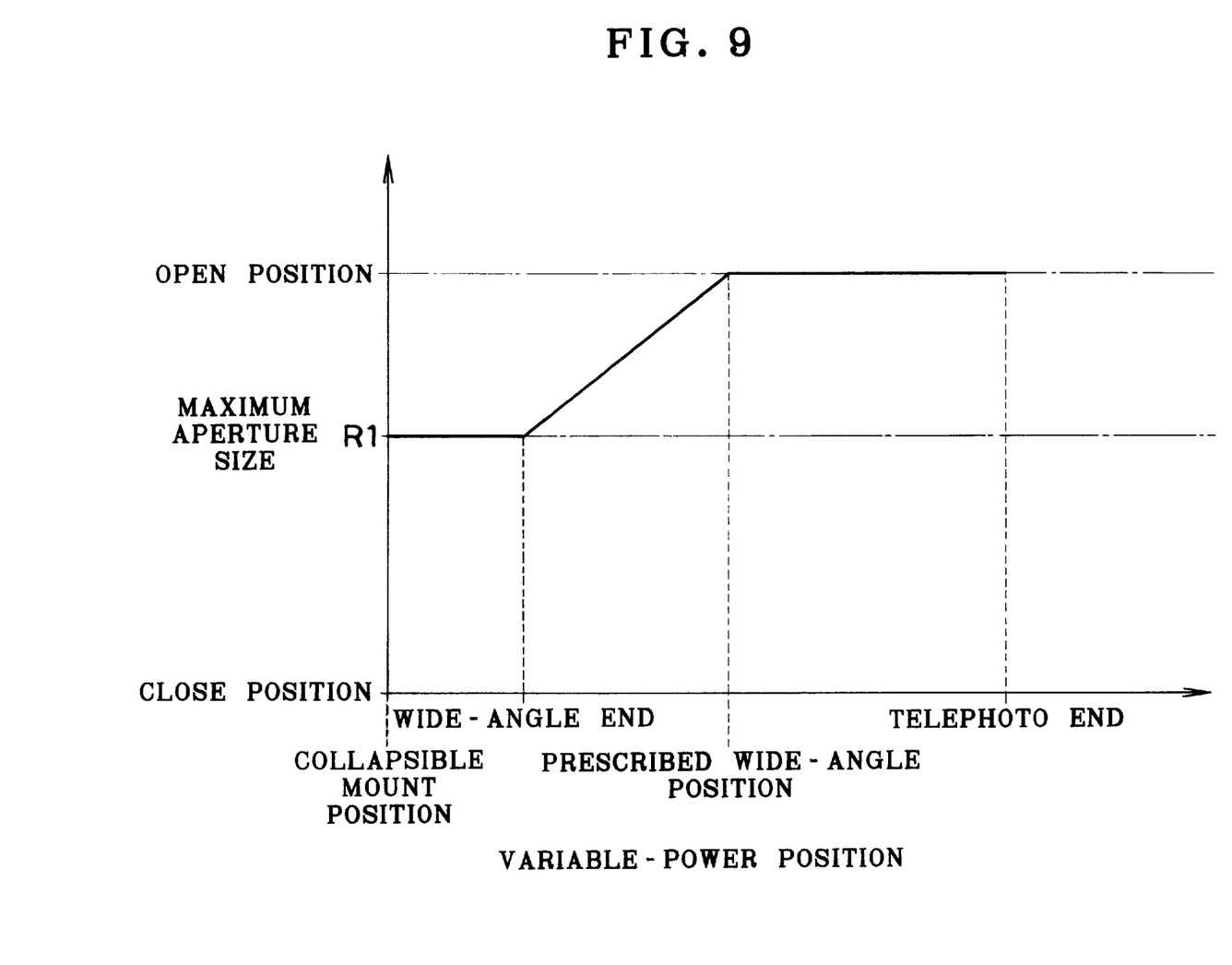
FIG. 9 is a graph showing a relationship between a focal length of a taking lens and a maximum aperture size of a shutter blade.

As shown in FIG. 1, a sectional shape of the cam 72 has a slope formed along a rotational direction whose center is the optical axis 13. Depth of the slope is adapted to be gradually deeper as the cam barrel 18 rotates when the magnification is changed from the wide-angle side to the telephoto side. Thus, the cam 72 gradually reduces a pressure amount for the projection 75 as the cam barrel 18 rotates from the wide-angle side toward the telephoto side. Thus, the maximum-aperture regulating mechanism 58 gradually enlarges the maximum aperture size of the shutter blades 55 and 56 until the whole of the shutter opening 59 is bared. Owing to this, as shown in FIG. 9, the maximum aperture size of the shutter blades 55 and 56 changes in accordance with the variable-power position. The maximum aperture size changes within a prescribed wide-angle range which is from the wide-angle end of the zoom lens 10 to the prescribed wide-angle position.

The other shutter blade 56 is provided with a cover member 80 as shown in FIG. 7. The cover member 80 constitutes a mechanism for detecting a shutter operation time. The cover member 80 constitutes this mechanism together with a photo sensor (photo reflector) 81. This photo sensor 81 is disposed at a position where the cover member 80 crosses an optical path of the photo sensor 81 just before the shutter blades 55 and 56 form the aperture in front of the shutter opening 59.

Figure 10:
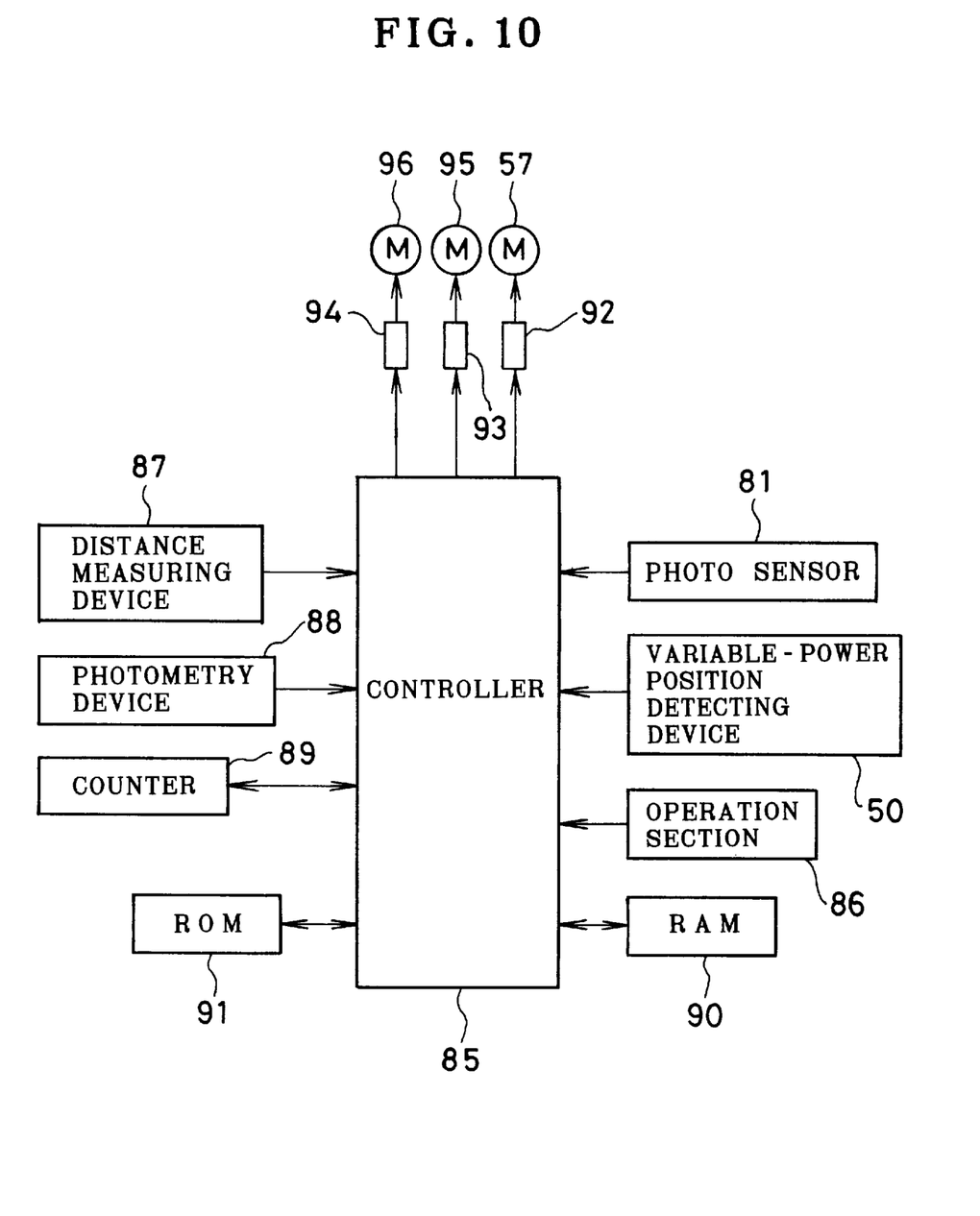
FIG. 10 is a block diagram schematically showing electrical structure of a camera having a zoom-lens barrel.

As shown in FIG. 10, a controller 85 of the camera is connected to an operation section 86, the photo sensor 81, the variable-power position detecting device 50, a distance measuring device 87, a photometry device 88, a counter 89, a RAM 90, and a ROM 91. Further, the controller 85 is also connected to the motor 57 for the shutter, a motor 95, and a focus motor 96 via drivers 92, 93 and 94 respectively. The counter 89 counts the operation time of the shutter blades 55 and 56 on the basis of a signal obtained from the photo sensor 81. The ROM 91 stores the operation time of the shutter blades 55 and 56 corresponding to a combination of the variable-power position and subject brightness. Moreover, the ROM 91 also stores the moving amount of the front lens group 11 corresponding to a combination of the variable-power position and a subject distance. The RAM 90 is for impermanently storing values which represent the subject distance obtained from the measuring device 87, the subject brightness obtained from the photometry value, the operation time of the shutter blades 55 and 56 read out from the ROM 91 and so forth. The operation section 86 comprises a power-source button, a shutter button, a zoom operating member and so forth.

Next, an operation of the above-mentioned structure is described bellow. The zoom lens 10 is initially set in the collapsible mount state such as shown in FIG. 3. At this time, the cam barrel 18 is put between the inner surface of the moving barrel 15 and the outer periphery of the shutter block 22. The projection 75 protruding from the shutter block 22 engages with the maximum-aperture regulating cam 72. A range from the collapsible mount position until the wide-angle position is not used for photographing. Thus, a portion of the cam 72 corresponding to this range has a depth so as not to give a load for the rotation of the cam barrel. Further, this portion of the cam 72 has a shape so as not to move the cam barrel in its radius direction.

When a power-supply switch of the camera is turned on, the controller 85 drives the motor 95 in response to this switch. The drive of the motor 95 is transmitted to the driving barrel 16 so that the driving barrel 16 is rotated in the fixed barrel 17 to move in the optical axis direction toward a subject. At the same time, the guide ring 21, the guide barrel 20 and the cam barrel 18 are also moved together with the driving barrel 16. Upon rotation of the driving barrel 16, the moving barrel 15 is moved in the optical axis direction toward the subject in a state that the rotation of the moving barrel 15 is prevented by the guide barrel 20. Moreover, the rotation of the driving barrel 16 is transmitted to the cam barrel 18 via the double gear 30. The cam barrel 18 is rotated in the guide barrel 20, and is moved in the optical axis direction of the driving barrel 16 in a state that the rotation of the rear-lens-group holder 19 is prevented by workings of the cam slot 42 and the guide groove 44. Thus, two lens groups 11 and 12 are respectively moved in the optical axis direction, changing an interval between them.

After the motor 95 has been driven, the controller 85 monitors a code signal obtained from the detecting device 50. The controller 85 stops to drive the motor 95 when the code signal representing the wide-angle end is received from the detecting device 50. Owing to this, the zoom-lens barrel 10 is positioned at the wide-angle end, such as shown in FIG. 4. In this state, the projection 75 is kept in engagement with the regulating cam 72.

When a photograph is taken, the controller 85 actuates the distance measuring device 87 and the photometry device 88 in response to half-depression of a shutter button. Then, a moving amount of the front lens group 11 is read out from the ROM 91 on the basis of a combination of the variable-power position and the subject distance. The focus motor 96 is driven by motor pulses corresponding to the moving amount of the front lens group 11. Thus, the front lens group 11 is moved in the optical axis direction relative to the moving barrel 15.

After that, the controller 85 actuates the shutter mechanism in response to full-depression of the shutter button for exposing. When the controller 85 actuates the shutter mechanism, the operation time of the shutter blades 55 and 56 corresponding to the variable-power position and the subject brightness is read out from the ROM 91 to be stored in the RAM 90. And then, an electric current is sent to the shutter motor 57. After that, the controller 85 monitors the photo sensor 81, and counts the time with the counter 89 from when a signal representing crossing of the shutter blades 55 and 56 has been received from the photo sensor 81.

Figure 11:
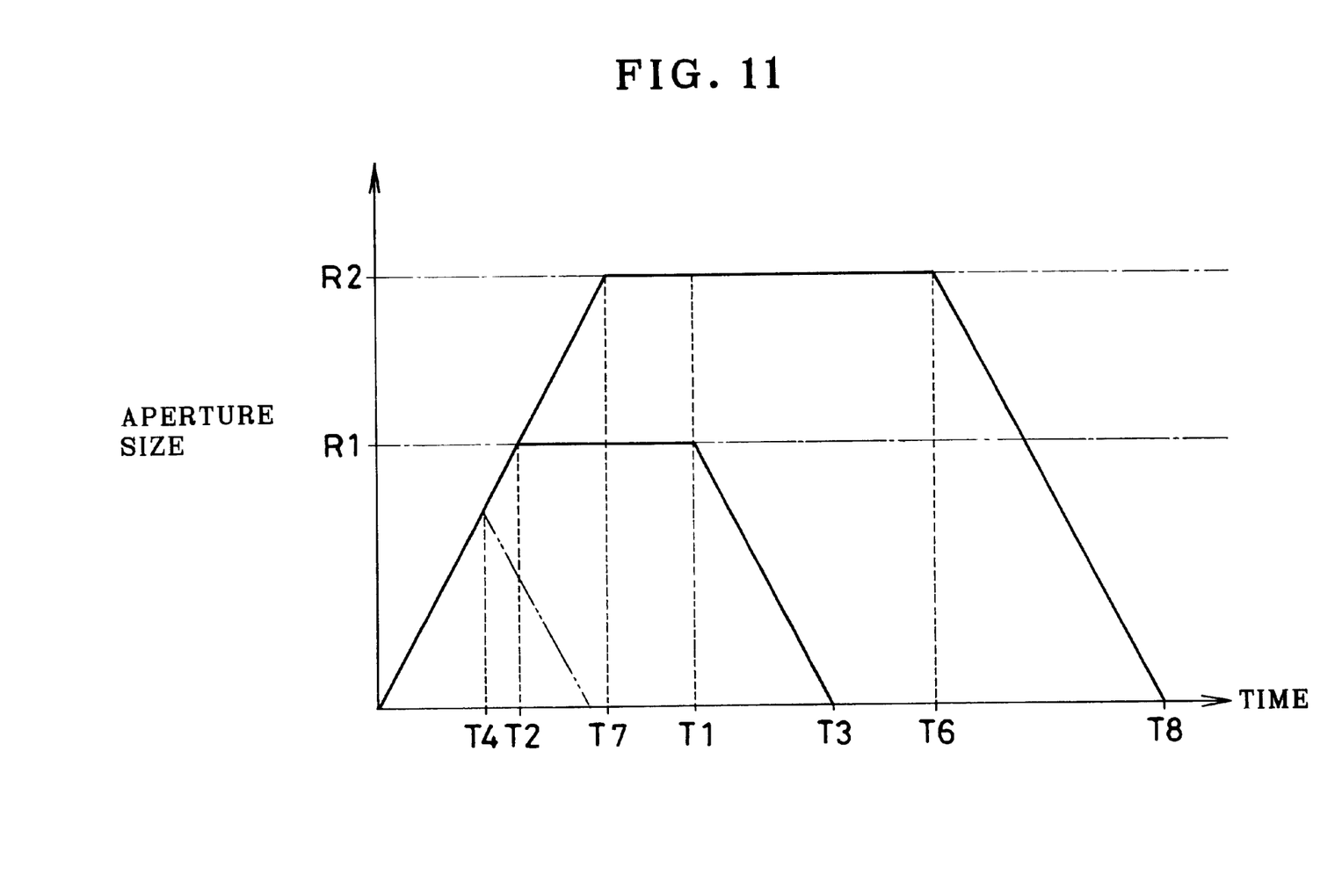
FIG. 11 is a graph showing a relationship between an operation of a program shutter and a time.

In FIG. 11, R1 denotes the maximum aperture size regulated at the wide-angle end, and T1 denotes the operation time of the shutter blades 55 and 56 corresponding to the variable-power position and the subject brightness. At the time T2, the shutter blades 55 and 56 have the maximum aperture size R1. At this time, as shown in FIG. 1, the part 70 of the shutter blades 55 abuts on the regulating pin 74 of the regulating member 71 so that the shutter blades 55 and 56 are adapted to have the maximum aperture size R1.

The controller 85 passes a reverse electric current through the motor 57 when the time counted by the counter 89 coincides with the operation time T1 of the shutter blades corresponding to the variable-power position and the subject brightness. Thus, the motor 57 is reversely driven to close the shutter blades 55 and 56. Hence, as shown in FIG. 11, the shutter blades 55 and 56 are set to the close position at the time T3. An exposure amount is represented by an area surrounded with lines regarding T2, T1 and T3.

By the way, in case the subject brightness is high, the shutter blades 55 and 56 are likely to be closed at the time T4 before these blades reach the maximum aperture size R1 regulated at the wide-angle end.

As shown in FIG. 9, the maximum aperture size of the shutter blades 55 and 56 regulated by the maximum-aperture regulating mechanism 58 gradually becomes larger as the magnification is changed from the wide-angle end toward the telephoto end.

When the variable power exceeds the prescribed wide-angle position, the shutter block 22 is undone from the inside of the cam barrel 18 toward a subject so that the engagement of the projection 75 and the regulating cam 72 are released. At this time, the regulating member 71 abuts on the stopper 77 owing to the urging force of the spring 76. The controller 85 stops the drive of the motor 95 when the code signal representing the telephoto end is received from the detecting device 50. Hence, as shown in FIG. 5, the zoom-lens barrel 10 is set to the telephoto-end.

Within a range from the prescribed wide-angle position to the telephoto end, the regulating member 71 is kept in abutting on the stopper 77 by means of the urging force of the spring 76, such as shown in FIG. 7. Thus, the maximum aperture size regulated by the shutter blades 55 and 56 corresponds to a full-open position of the shutter blades 55 and 56 where the whole of the shutter opening 59 is bared. In FIG. 11, R2 denotes the maximum aperture size regulated at the telephoto end, and T6 denotes the operation time of the shutter blades 55 and 56 corresponding to the variable-power position and the subject brightness. The shutter blades 55 and 56 abut on the regulating member 71 at the time T7, and the whole of the shutter opening 59 is bared. Then, the shutter blades 55 and 56 are rotated in a closing direction when the time counted by the counter 89 is identical to the time T6. Further, the shutter blades 55 and 56 are set to the close position at the time T8.

The maximum aperture size becomes smaller at the wide-angle end rather than at the telephoto end so that it is possible to surely prevent a image periphery blur which is likely to occur at the wide-angle side and is caused by spherical aberration.

In the above-described embodiment, the zoom lens is a double-barrel type in which the moving barrel 15 and the driving barrel 16 are moved in the optical axis direction. However, the present invention is not exclusive to this. The zoom lens may be a single-barrel type in which the driving barrel 16 is fixed and only the moving barrel 15 is moved.

As described above, in the aperture regulating device according to the present invention, the shutter block enters the cam barrel and the projection of the regulating member engages with the cam groove. This cam groove is obliquely formed in the inner face of the cam barrel, and is provided along the rotational direction around the photographic optical axis. Thus, it is possible to shorten the cam barrel in the optical axis direction, and according to this, the size of the lens barrel itself may be reduced. Further, the cam groove may be formed so as to be long. Thus, it is possible to accurately control the maximum aperture size of the shutter blades which is changed in accordance with the variable power.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. An apparatus for regulating a maximum size of an aperture in accordance with magnification of an optical system, said aperture being formed by a shutter blade and this shutter blade being moved by an operation mechanism of a shutter block along a rectangular face of an optical axis of said optical system to open and close a shutter opening, said apparatus comprising:

a maximum-aperture regulating member provided in said shutter block and for regulating said maximum aperture size of said shutter blade by catching said shutter blade during its opening operation;

a projection for moving said maximum-aperture regulating member and for changing a position where said shutter blade is caught, said projection protruding from said shutter block;

a rotatable cam barrel for varying said magnification of said optical system by moving said optical system in an optical axis direction, said shutter block entering said cam barrel while said magnification is varied; and a cam portion for pressing said projection in accordance with said magnification of said optical system when said shutter block enters said cam barrel, said cam portion being formed in an inner face of said cam barrel and obliquely extending in a rotational direction of said cam barrel so as to contact with said projection during the rotation of said cam barrel.

2. An apparatus according to claim 1, wherein said cam portion is a cam groove having a depth corresponding to said maximum aperture size.

3. An apparatus according to claim 2, wherein said optical system is a zoom lens system.

4. An apparatus according to claim 2, wherein said maximum-aperture regulating member is rotated around a shaft being parallel with said optical axis of said optical system, and said projection is integrally formed with said maximum-aperture regulating member.

5. An apparatus according to claim 4, further including:

a stop pin for stopping said maximum-aperture regulating member at a position where said shutter blade takes an aperture size by which said shutter opening is wholly opened; and a spring for urging said maximum-aperture regulating member so as to abut on said stop pin.

6. An apparatus according to claim 5, wherein said cam barrel is moved in said optical axis direction, whereas said cam barrel is prevented from moving relative to a driving barrel in said optical axis direction, said driving barrel being rotated when said magnification is varied.

7. An apparatus according to claim 6, further including:

a moving barrel fitted to an outer face of said cam barrel and for moving in said optical axis direction without rotating, said shutter block being attached to said moving barrel.

8. An apparatus for regulating a maximum size of an aperture in accordance with magnification of an optical system, said aperture being formed by a shutter blade and this shutter blade being moved by an operation mechanism of a shutter block along a rectangular face of an optical axis of said optical system to open and close a shutter opening, said apparatus comprising:

a driving barrel rotated when said magnification is varied;

a moving barrel joined into said driving barrel in helicoid structure, said shutter block being attached to the inside of said moving barrel;

a straight guide barrel positioned in said moving barrel and for straightly moving said moving barrel without rotating it while said driving barrel is rotated;

a first lens group attached to the inside of said moving barrel and in front of said shutter block, said first lens group being moved in an optical axis direction together with said moving barrel;

a maximum-aperture regulating member provided in said moving barrel and for regulating said maximum aperture size of said shutter blade by catching said shutter blade during its opening operation;

a projection for moving said maximum-aperture regulating member and for changing a position where said shutter blade is caught, said projection protruding from said shutter block;

a cam barrel rotating in said straight guide barrel without moving relative to said driving barrel and said straight guide barrel in said optical axis direction when said driving barrel is rotated, said shutter block entering said cam barrel while said moving barrel goes back along said optical axis;

a second lens group provided in said cam barrel and moving in said optical axis direction when said cam barrel is rotated, said second lens group constituting said optical system together with said first lens group; and a cam portion for pressing said projection when said shutter block enters said cam barrel, said cam portion being formed in an inner face of said cam barrel and obliquely extending in a rotational direction of said cam barrel so as to contact with said projection during the rotation of said cam barrel.

9. An apparatus according to claim 8, wherein said cam portion is a cam groove having a depth corresponding to said maximum aperture size.

10. An apparatus according to claim 9, wherein said maximum-aperture regulating member is rotated around a shaft being parallel with said optical axis, and said projection is integrally formed with said maximum-aperture regulating member.

11. An apparatus according to claim 10, further including:

a stop pin for stopping said maximum-aperture regulating member at a position where said shutter blade takes an aperture size by which said shutter opening is wholly opened; and a spring for urging said maximum-aperture regulating member toward a position for abutting on said stop pin.

12. An apparatus for regulating a maximum size of an aperture in accordance with magnification of an optical system, said aperture being formed by a shutter blade and this shutter blade being moved by an operation mechanism of a shutter block along a rectangular face of an optical axis of said optical system to open and close a shutter opening, said apparatus comprising:

a maximum-aperture regulating member provided in said shutter block and for regulating said maximum aperture size of said shutter blade by catching said shutter blade during its opening operation;

a projection for moving said maximum-aperture regulating member and for changing a position where said shutter blade is caught, said projection protruding from said shutter block; and a cam portion for pressing said projection in accordance with said magnification of said optical system, said cam portion being rotated when said projection is straightly moved in said optical axis direction, and said cam portion obliquely extending relative to a rotational direction thereof so as to contact with said projection during the relative movement of said cam portion.

* * * * *

UNITED STATES PATENT AND TRADEMARK OFFICE
CERTIFICATE OF CORRECTION

PATENT NO.    : 6,222,684 B1
DATED         : April 24, 2001
INVENTOR(S)   : Syunji Nishimura It is certified that error appears in the above-identified patent and that said Letters Patent is hereby corrected as shown below:

<u>Title page,</u>
Amend Item [30] to read as follows:
-- [30]    Foreign Application Priority Data
Feb. 16, 1999    (JP) ....................11-037031 --.

Signed and Sealed this

Sixteenth Day of October, 2001

Attest:

*Attesting Officer*

NICHOLAS P. GODICI
*Acting Director of the United States Patent and Trademark Office*